United States Patent
Hozumi et al.

(10) Patent No.: US 9,403,603 B2
(45) Date of Patent: Aug. 2, 2016

(54) SAFETY MONITORING SYSTEM OF GALLEY

(71) Applicant: JAMCO CORPORATION, Tokyo (JP)

(72) Inventors: Hiroyuki Hozumi, Tokyo (JP); Jun Suzuki, Tokyo (JP); Syuichi Sasaki, Tokyo (JP)

(73) Assignee: JAMCO CORPORATION, Tokyo (JP)

( * ) Notice: Subject to any disclaimer, the term of this patent is extended or adjusted under 35 U.S.C. 154(b) by 278 days.

(21) Appl. No.: 14/267,207

(22) Filed: May 1, 2014

(65) Prior Publication Data

US 2015/0070492 A1    Mar. 12, 2015

(30) Foreign Application Priority Data

Sep. 9, 2013    (JP) ................. 2013-186293

(51) Int. Cl.

| | |
|---|---|
| *B64D 47/08* | (2006.01) |
| *B64D 11/00* | (2006.01) |
| *B64D 11/04* | (2006.01) |
| *E05C 1/06* | (2006.01) |
| *A47J 27/04* | (2006.01) |
| *H04Q 5/22* | (2006.01) |
| *B64D 45/00* | (2006.01) |

(52) U.S. Cl.
CPC ............... *B64D 47/08* (2013.01); *B64D 11/00* (2013.01); *B64D 11/0007* (2013.01); *B64D 11/04* (2013.01); *B64D 45/00* (2013.01)

(58) Field of Classification Search
CPC ..... B64D 47/08; B64D 11/04; B64D 11/0007
USPC ........................................................ 348/143
See application file for complete search history.

(56) References Cited

U.S. PATENT DOCUMENTS

| 6,357,806 B1 * | 3/2002 | Saku ................. B64D 11/0007 292/140 |
| 8,519,824 B1 * | 8/2013 | Rankin ................. B64D 11/00 244/118.5 |
| 2012/0160111 A1 * | 6/2012 | Hozumi ............... F24C 15/327 99/474 |
| 2012/0254923 A1 | 10/2012 | Riedel et al. |

FOREIGN PATENT DOCUMENTS

| JP | 2006-88927 A | 4/2006 |
| JP | 2007-528645 A | 10/2007 |
| JP | 2013-116667 A | 6/2013 |

OTHER PUBLICATIONS

Extended European Search Report dated Feb. 11, 2015, issued in corresponding European Application No. 14169652.6. (5 pages).

* cited by examiner

*Primary Examiner* — Hee-Yong Kim
(74) *Attorney, Agent, or Firm* — Westerman, Hattori, Daniels & Adrian, LLP

(57) ABSTRACT

Provided is a system in which a camera monitors safety of a galley arranged in a cabin of an aircraft. A galley 100 includes a storage space 130 of carts divided by structural members 110, and carts 150 are stored. Turn retainers 200 in closed positions prevent the carts 150 from flying out. Hinged doors 310 are attached to front sides of compartments 300, and latches 320 lock the hinged doors 310. A monitoring camera 500 determines safety or unsafety of the turn retainers 200 and the latches 320 by an image and displays the safety or unsafety on a display device 600 or on a PDA terminal device 800 carried by a cabin attendant CA.

4 Claims, 5 Drawing Sheets

FWD

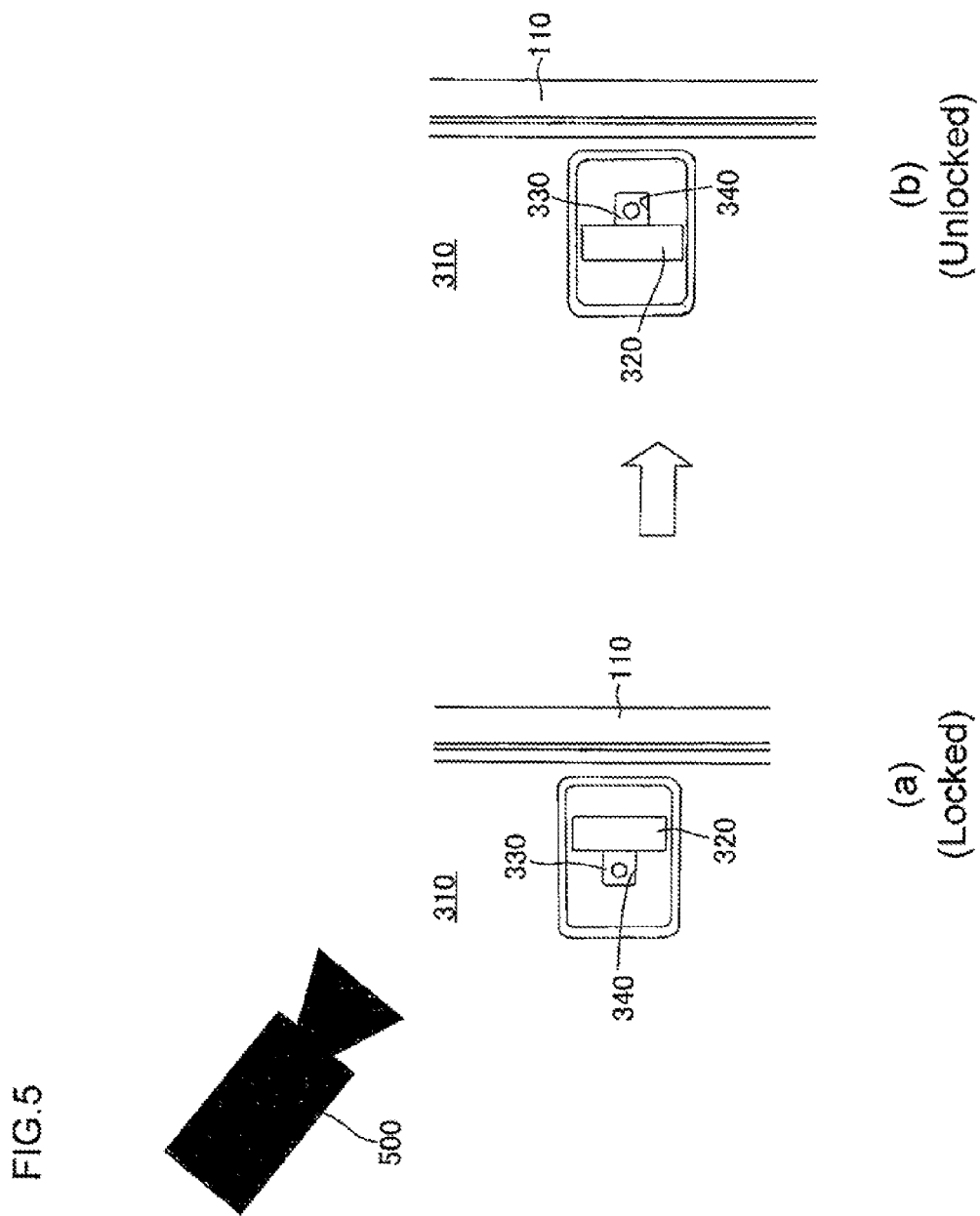

SAFETY MONITORING SYSTEM OF GALLEY

The present application is based on and claims priority of Japanese patent application No. 2013-186293 filed on Sep. 9, 2013, the entire contents of which are hereby incorporated by reference.

BACKGROUND OF THE INVENTION

1. Field of the Invention

The present invention relates to a safety monitoring system of a galley (kitchen equipment) installed in a cabin of an aircraft.

2. Description of the Related Art

A galley installed in a cabin of an aircraft includes a space for housing service carts for serving food and drink to passengers and includes turn levers called turn retainers for keeping the carts in predetermined positions.

The galley further includes a large number of box-shaped compartments for housing food, cooking equipment, and the like, and hinged doors are arranged on front sides of the compartments. The hinged doors include handles for opening and closing and include latches that slide in a transverse direction to lock the hinged doors in closed positions.

During takeoff and landing of the aircraft, it is obliged to confirm that the turn retainers are in predetermined closed positions and that the latches are in closed positions, in order to prevent the carts from flying out and to prevent the hinged doors from opening. Although the safety inspection in the galley is work of cabin attendants, a failure such as an oversight tends to occur because the inspection is visually performed.

An increase in the number of takeoffs and landings of recent years represented by LCC is imposing excessive burden on the cabin attendants.

Japanese Patent Laid-Open Publication No. 2006-88927 and National Publication of International Patent Application No. 2007-528645 disclose installation of a monitoring camera in the aircraft.

An object of the present invention is to provide a system for improving the safety and reducing the burden of work of cabin attendants by installing a monitoring camera in a galley to optically monitor positions of turn retainers and latches and wirelessly reporting the status to the cabin attendants.

SUMMARY OF THE INVENTION

To attain the object, a galley as a target of a safety monitoring system of the present invention includes: a cart storage space for storing service carts formed by plate-like structural members; turnable turn retainers installed above the cart storage space; hinged doors attached to front sides of box-shaped compartments for housing goods; and sliding latches for locking the hinged doors, and the galley further includes a monitoring camera fixed to the galley to monitor a front side of the galley. The monitoring camera has a function of taking and storing, in advance, an image of the turn retainers and the latches in closed positions, sending a signal indicative of safety when the monitoring camera recognizes that the turn retainers and the latches are in the closed positions, and sending a signal indicative of unsafety when the monitoring camera recognizes that the turn retainers and the latches are in positions other than the closed positions.

The safety monitoring system further includes a display device attached to a side of the galley to receive and display a signal from the monitoring camera.

The safety monitoring system can further include: a wireless transmission module attached to the galley to send a signal from the monitoring camera; and a portable terminal device that receives and displays a signal from the wireless transmission module.

As described, the present invention can optically monitor and confirm that the turn retainers and the latches in the galley are in predetermined positions. This can improve the safety and reduce the burden of the cabin attendants.

BRIEF DESCRIPTION OF THE DRAWINGS

FIG. 5 is an explanatory view of safety check of the latch by a monitoring camera.

DETAILED DESCRIPTION OF THE PREFERRED EMBODIMENT

Figure 1:
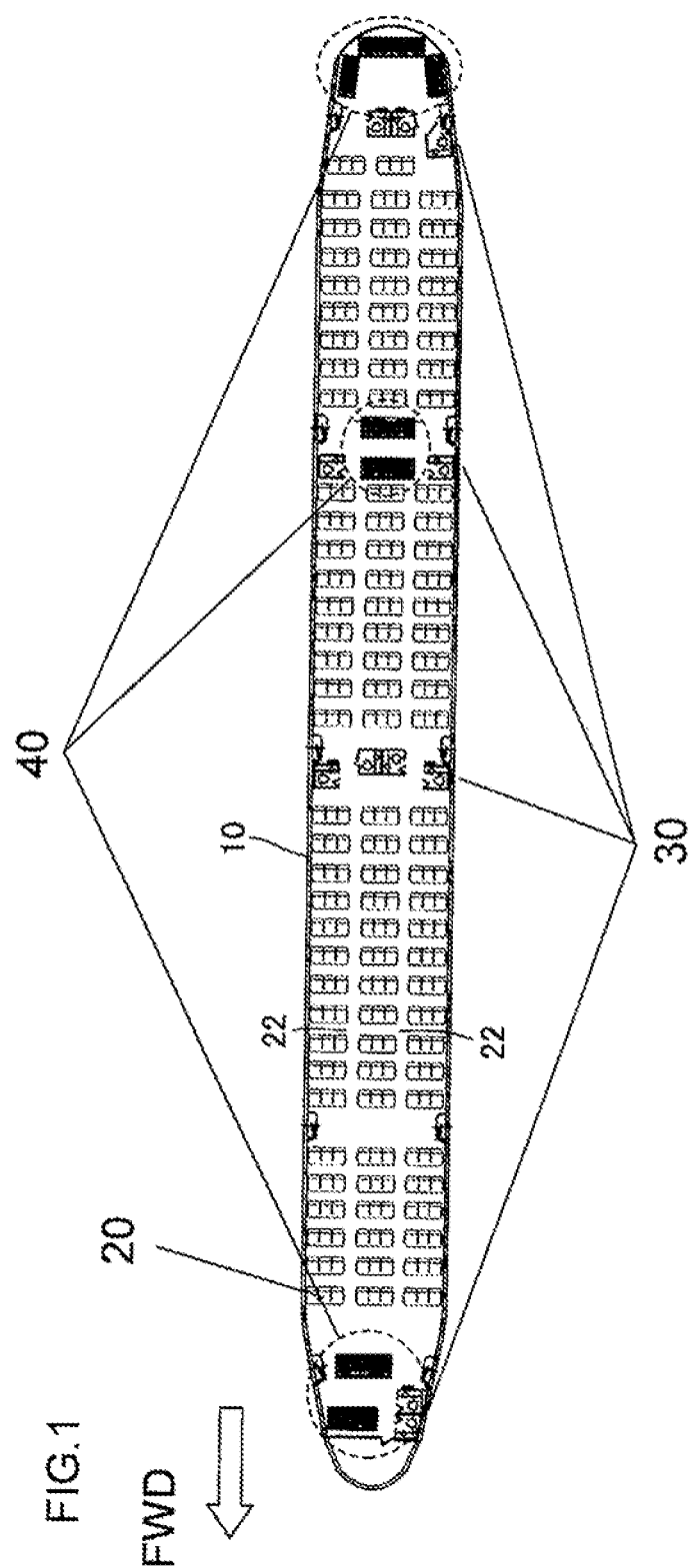
FIG. 1 is a plan view of a cabin of an aircraft in which the present invention is applied.
Figure 2:
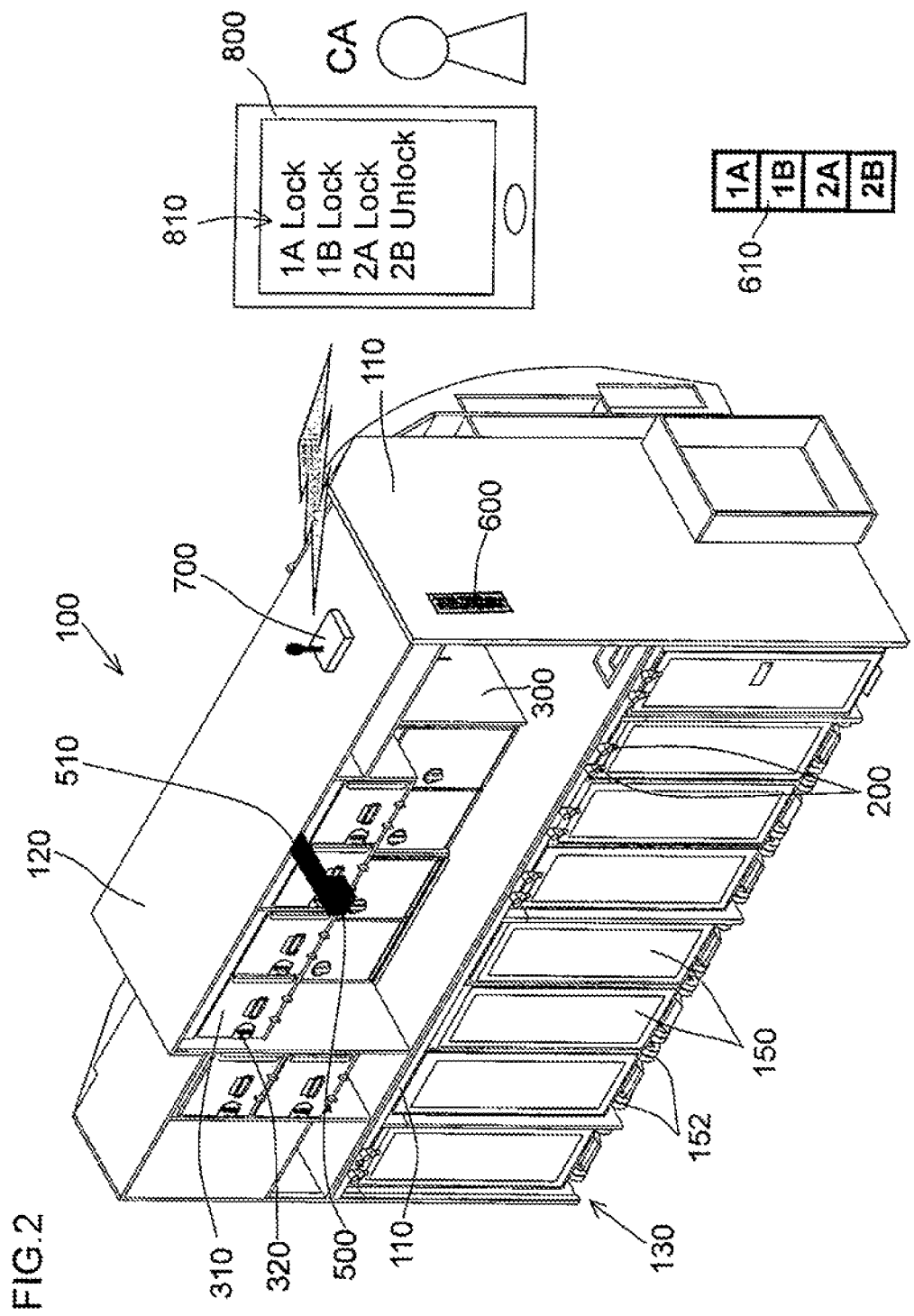
FIG. 2 is a perspective view of a galley.

FIG. 1 is a plan view of a cabin of an aircraft equipped with a galley of the present invention. FIG. 2 is a perspective view of the galley. An aircraft cabin 10 includes seats 20 used by passengers and lavatories (restrooms) 30 used by the passengers through passages 22. Galley spaces 40 for serving beverages and meals to the passengers by cabin attendants CA are provided at appropriate positions of the aircraft cabin 10.

One or a plurality of galleys 100 are mounted on each galley space 40. The shape and the structure of the galley 100 are designed according to the airframe structure of the galley space 40 equipped with the galley 100 or according to the requirement of the airline to be used.

The galley 100 is formed by plate-like structural members 110, and a cart storage space 130 is arranged, facing the floor. A plurality of service carts 150 are stored in the cart storage space 130. The service carts 150 include casters 152, and the cabin attendants CA can easily move the service carts 150. In the cart storage space 130, the casters 152 are locked, and engagement devices fix the service carts 150 to the floor.

Particularly, during takeoff and landing, turn retainers 200 attached to the structural members 110 hold the service carts 150 to prevent the service carts 150 from flying out from the cart storage space 130. The cabin attendants CA operate the turn retainers 200.

Figure 3A:
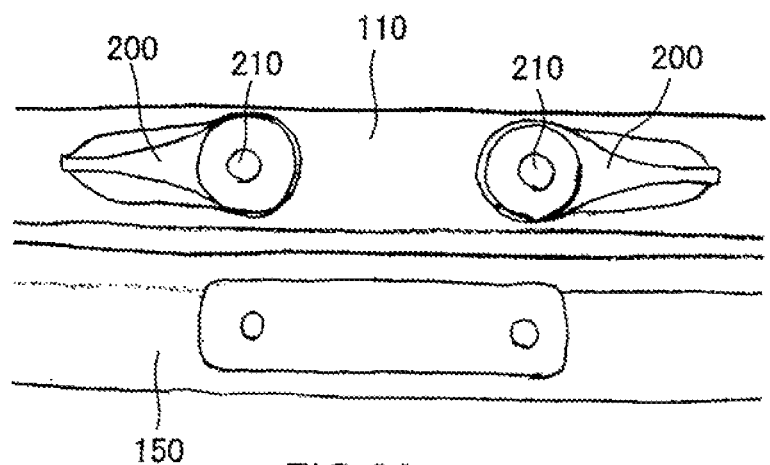
FIG. 3A is an explanatory view of turn retainers.
Figure 3B:
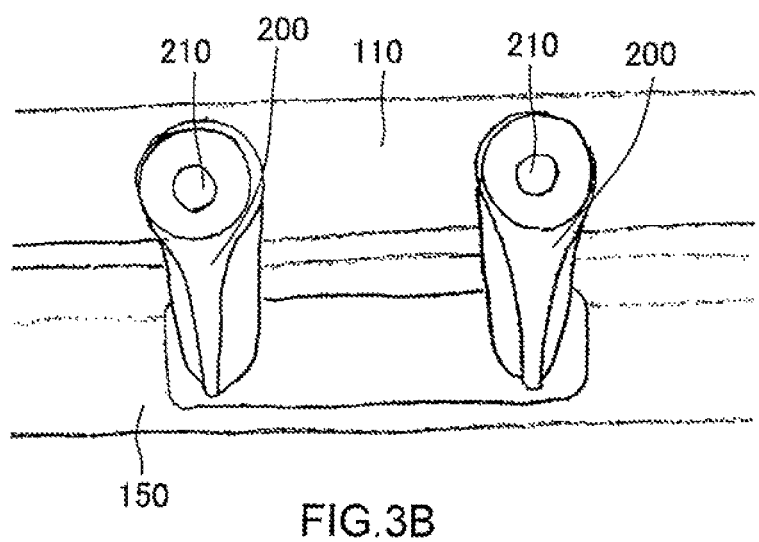
FIG. 3B is an explanatory view of the turn retainers.

FIGS. 3A and 3B show details of the turn retainers 200.

The turn retainers 200 turn about shafts 210. Stoppers act when the turn retainers 200 are in horizontal positions and vertical positions, and inadvertent turning is prevented.

In FIG. 3A, the turn retainers 200 are in open positions in which the turn retainers 200 face horizontal directions, and the service carts 150 can be drawn out or stored in the cart storage space 130.

In FIG. 3B, the turn retainers 200 are in closed positions in which the turn retainers 200 face vertical directions, and the turn retainers 200 keep the front sides of the service carts 150 to prevent the service carts 150 from flying out from the cart storage space 130.

A plurality of box-shaped compartments 300 that house food, tableware, cooking equipment, and the like are arranged above the cart storage space 130 of the galley 100.

Hinged doors 310 are arranged on the front sides of the compartments 300, and latches 320 lock the hinged doors 310.

Figure 4A:
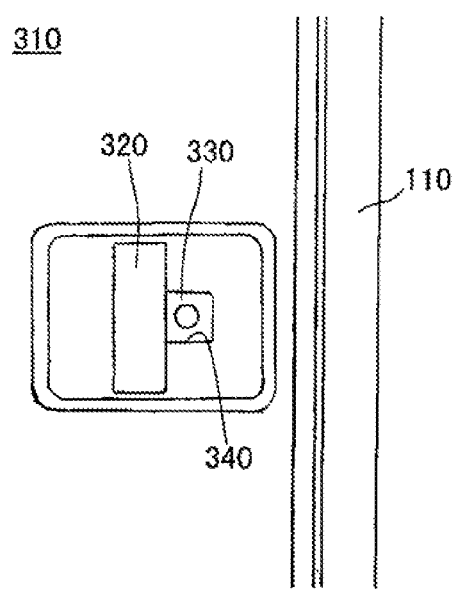
FIG. 4A is an explanatory view of a latch.
Figure 4B:
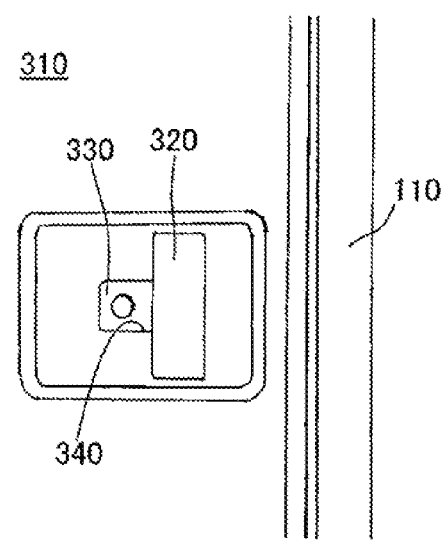
FIG. 4B is an explanatory view of the latch.

FIGS. 4A and 4B show details of the latch 320. The latch 320 is connected to a slider 330. When the latch 320 is operated in the horizontal direction, the slider 330 moves along a slide groove 340 to form locked and unlocked states.

FIG. 4A shows an open state in which the latch 320 is operated to the left, and the slider 330 is removed from a catch arranged on the structural member 110.

FIG. 4B shows a closed state, in which the latch 320 is operated to the right, and the slider 330 is engaged with the catch arranged on the structural member 110.

Particularly, during takeoff and landing of the aircraft, it is obliged to close the hinged doors 310 of all compartments 300 in the galley 100 and to surely operate the latches 320 to closed positions (locked positions).

The cabin attendants CA operate the latches 320. However, a flight with a short gap between takeoff and landing increases the burden of the cabin attendants CA for the operation of the turn retainers 200 and the latches 320 of the galley 100 and for the safety check.

In a monitoring system of the present invention, the galley 100 is equipped with a monitoring camera to optically monitor operation positions of the turn retainers 200 and the latches 320 to enable automatic check of the safety.

As shown in FIG. 2, a camera support 510 protrudes from a ceiling member 120 that forms a housing of the galley 100, and a monitoring camera 500 is installed on the tip of the camera support 510.

FIG. 5 shows a state of the monitoring camera 500 monitoring the positions of the hinged door 310 and the latch 320.

Part (a) of FIG. 5 shows a locked position in which the latch 320 is positioned to the right, and the latch 320 is engaged with the catch of the structural member 110.

The monitoring camera 500 images this state to recognize and store that the state is safe.

Part (b) of FIG. 5 shows an unlocked position in which the latch 320 is positioned to the left, and the slider 330 is removed from the catch of the structural member 110. The monitoring camera 500 images this state to recognize and store that the state is unsafe.

Although part (b) of FIG. 5 shows a completely unsafe state, if the taken image does not match with the image of part (a) of FIG. 5, it is obviously possible to generate a signal indicating that confirmation is necessary or to recognize that the state is unsafe.

The safety or unsafety of the turn retainer 200 is similarly determined by processing an image taken by the monitoring camera 500.

FIG. 2 shows an example that the structural member 110 forming a sidewall of the galley 100 is equipped with a galley side display device 600. The signal processed by the monitoring camera 500 is transmitted to the galley side display device 600, and a display screen 610 is displayed.

Signs indicating the installation locations of the turn retainers 200 and the latches 320 as well as corresponding locked and unlocked states are illustrated in different colors, and the cabin attendants CA can visually check the safety and unsafety at first glance of the display screen 610. If an unsafe location is displayed, the corresponding turn retainer 200 or latch 320 is operated to a safe position, and this is checked in the display screen 610.

The system of the present invention can also include a wireless transmission module 700 on the ceiling member 120 of the galley 100.

The monitoring camera 500 takes an image, and information determined to be safe or unsafe is transmitted from the wireless transmission module 700 to a PDA terminal device 800 carried by the cabin attendant CA and displayed on a display screen 810.

The cabin attendant CA can view the display screen 810 to remotely check the safety of the galley 100.

Therefore, the CA can monitor the safety of the galley 100 at a distant position while performing work, such as checking the seat belts of the cabin and checking the locks of the doors of overhead luggage compartments. This can reduce the burden of work and improve the efficiency.

What is claimed is:

1. A safety monitoring system of a galley installed in a cabin of an aircraft, the galley comprising: a cart storage space for storing service carts formed by plate-like structural members; turnable turn retainers installed above the cart storage space; hinged doors attached to front sides of box-shaped compartments for housing goods; and sliding latches for locking the hinged doors, the galley further comprising a monitoring camera fixed to the galley to monitor a front side of the galley, wherein the monitoring camera has a function of taking and storing, in advance, an image of the turn retainers and the latches in closed positions, sending a signal indicative of safety when the monitoring camera recognizes that the turn retainers and the latches are in the closed positions, and sending a signal indicative of unsafety when the monitoring camera recognizes that the turn retainers and the latches are in positions other than the closed positions.

2. The safety monitoring system of the galley according to claim 1, further comprising a display device attached to a side of the galley to receive and display a signal from the monitoring camera.

3. The safety monitoring system of the galley according to claim 1, further comprising:

a wireless transmission module attached to the galley to send a signal from the monitoring camera; and a portable terminal device that receives and displays a signal from the wireless transmission module.

4. The safety monitoring system of the galley according to claim 1, further comprising:

a display device attached to a side of the galley to receive and display a signal from the monitoring camera;

a wireless transmission module attached to the galley to send a signal from the monitoring camera; and a portable terminal device that receives and displays a signal from the wireless transmission module.

\* \* \* \* \*